United States Patent [19]
Hein

[11] 3,758,220
[45] Sept. 11, 1973

[54] ELASTOMERIC EXPANSION JOINT

[75] Inventor: Richard D. Hein, Wabash, Ind.

[73] Assignee: The General Tire & Rubber Company, Akron, Ohio

[22] Filed: Jan. 27, 1972

[21] Appl. No.: 221,342

[52] U.S. Cl. ................................................ 404/67
[51] Int. Cl. ............................................ E01c 11/12
[58] Field of Search ................ 94/18, 18.2; 404/47, 404/67; 14/16; 52/400, 403

[56] References Cited
UNITED STATES PATENTS

| | | | |
|---|---|---|---|
| 3,555,982 | 1/1971 | George | 94/18 |
| 3,527,009 | 9/1970 | Nyquist | 94/18 |
| 1,711,842 | 5/1929 | Hall | 94/18.2 |
| 2,954,310 | 9/1960 | Truesdell et al. | 52/400 |
| 3,375,763 | 4/1968 | Welch | 94/18 |
| R26,733 | 12/1969 | Welch | 94/18 |

FOREIGN PATENTS OR APPLICATIONS

| | | | |
|---|---|---|---|
| 1,223,802 | 3/1971 | Great Britain | 94/18 |
| 1,256,245 | 12/1967 | Germany | 14/16 |

*Primary Examiner*—Roy D. Frazier
*Assistant Examiner*—Thomas J. Holko

[57] ABSTRACT

A reinforced elastomeric expansion joint is constructed so as to flex or bend by utilizing, as an internal rigid reinforcement, a series of spaced narrow plates joined by flexible means such as wire cable. The narrow plates combine to effect sufficient support, but the presence thereof within the joint does not preclude the joint from being bent when required, such as for connecting the intersection of a curb and gutter on a bridge or roadway.

3 Claims, 7 Drawing Figures

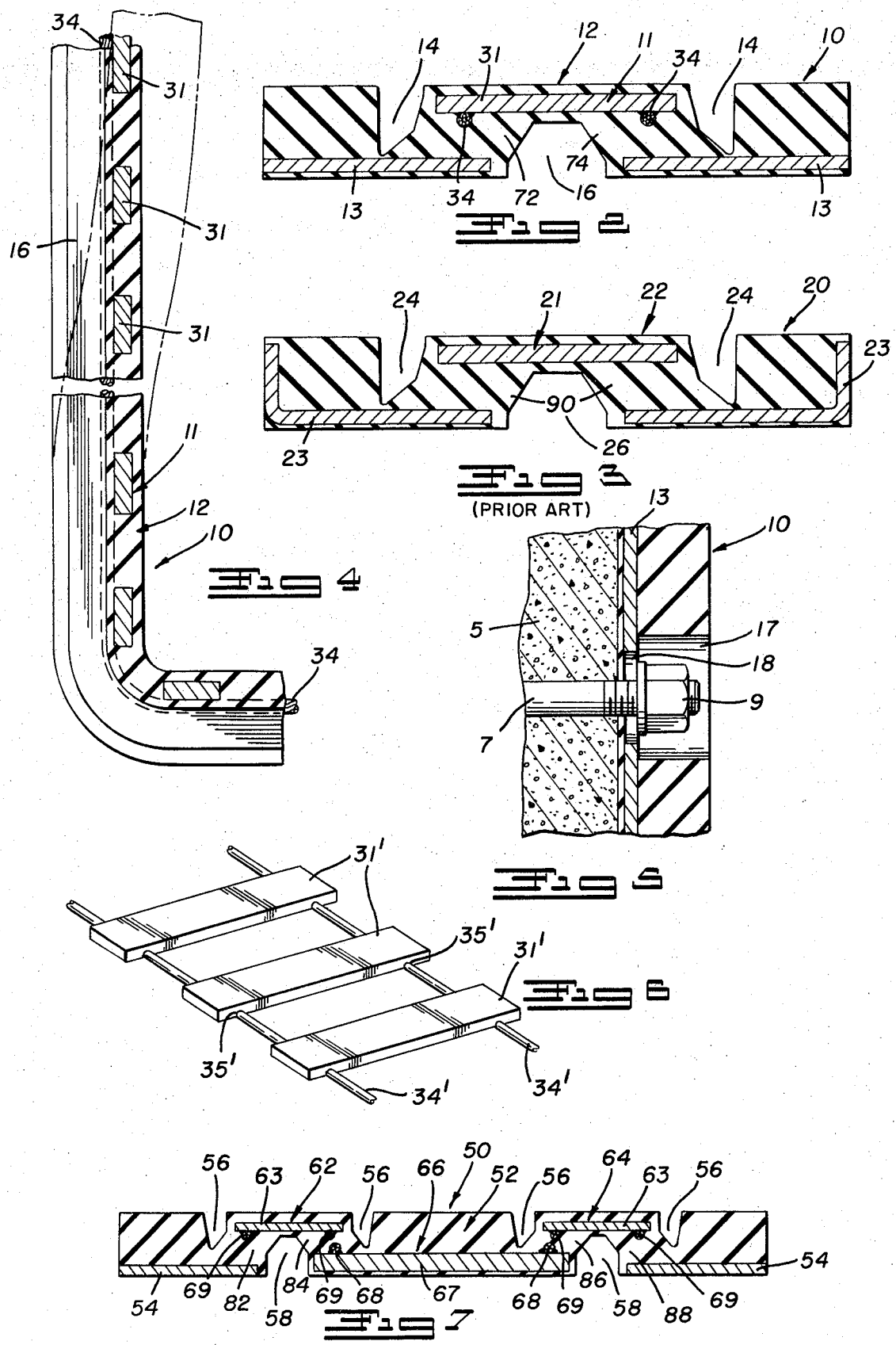

ELASTOMERIC EXPANSION JOINT

BACKGROUND OF THE INVENTION

This invention relates to expansion joints used to span gaps between sections of highways, bridges, airport runways or the like. More particularly, the invention relates to an elastomeric type of expansion joint which is usually provided with internal reinforcement to resist bending moments of vertical forces applied by the weight of a vehicle passing over the joint and stiffen the joint to prevent upward buckling.

Proper construction of highways, bridges, runways or the like (hereinafter collectively called "roadways") requires that gaps be left between sections of the roadway to compensate for expansion and contraction due to ambient temperature fluctuations. This necessitates that some means be incorporated within these gaps to contract and expand with movement of the adjacent sections of roadway and provide a smooth transition between the adjacent section. Elastomeric expansion joints are one such means currently used for this purpose.

Typically, these expansion joints comprise a deformable body of elastomeric material designed to withstand abuse by traffic and to withstand large and sudden loads. The upper surface of the joint is usually designed to provide a smooth transition from one section of the roadway to the other. Elastomeric joints are also usually designed to provide a good water and weathertight seal and are adapted to contract and expand with movement of the adjacent roadway sections, while still maintaining, a smooth transition therebetween. Usually, shoulders are provided on the adjacent roadway sections to which the edges of the joint are anchored. Thus, the joint is made of such thickness so that when supported on these shoulders, the top surface of the joint is substantially flush with the top surface of the roadway.

A gap between adjacent roadway sections normally extends across the entire width of the roadway. An elastomeric joint spanning the gap is normally constructed of a plurality of longitudinal sections connected end to end across the width of the roadway.

Frequently, elastomeric expansion joint sections are provided with rigid reinforcement plates totally or partially embedded within the section to add a stiffening factor to the joint to resist bending moments of the vertical force applied by the weight of a vehicle passing over the joint and to prevent an upward buckling of the joint when the joint undergoes contraction. These rigid reinforcing plates normally extend substantially the entire length of the elastomeric joint body or section.

As stated above, the elastomeric joint is a deformable body which readily adapts itself to changes in width of the gap between adjacent sections of roadway. An elastomeric joint can be adapted to contract or expand in a number of ways. The joint may expand or contract by stretching or compression of the body as is characteristic of the type of elastomeric expansion joint disclosed and claimed in U.S. Pat. No. 3,363,522, assigned to the present assignee. Alternatively, expansion and contraction of the joint may be effected through a shearing action of selected portions of the elastomeric body, such as is characteristic of the type of expansion joint disclosed and claimed in U.S. Reissue Pat. No. 26,733, also assigned to the present assignee.

As stated previously, a full expansion joint is normally made up of expansion joint bodies or sections. These bodies or sections are normally molded or otherwise constructed at some prescribed length and joined end to end across the width of the roadway. In many cases, the gap between adjacent roadway sections is necessarily extended to include the gutter and curb area along the sides of the roadway. Thus, joints and/or seals are necessary to span the gaps of the adjacent curb and gutter sections of the roadways. Usually the joint which spans the gap from the gutter across the curb is composed of two or more body sections because of the abrupt change in the roadway surface contour. Also, unless the elastomeric joint sections of prescribed length joined end to end across the roadway results in the section in the gap across the gutter portion ending substantially flush with the vertical curb face, it becomes necessary to cut these prescribed lengths of joints in sections to a length which fits within the gap in the gutter adjacent the curb. This specially cut length of elastomeric joint body or section is then joined to another specially cut length of joint section extending vertically along the face of the curb.

This special fitting and sizing of joint sections is tedious, time-consuming, and relatively expensive. To resolve these problems, it has been attempted to bend lengths or sections of an elastomeric expansion joint as molded to conform to abrupt changes in roadway contour such as in the curb and gutter area. It has been found practically impossible to bend elastomeric joint sections which are internally reinforced by rigid plates which extend the length of the section. It has also been suggested that all or some of these plates be removed so that the joint or section might be bent or flexed. However, it has been found that indiscriminate removal of these reinforcing plates can adversely affect the joint section by rendering it ineffective to resisting the bending moments previously mentioned and to allow the section to bulge during contraction.

BRIEF DESCRIPTION

It is an object of the present invention to provide an expansion joint which can be bent or flexed to conform to abrupt changes in a roadway surface.

It is a further object of the present invention to provide an elastomeric expansion joint which can be bent of flexed to conform to changes in a roadway contour and which resists bending moments due to forces imposed therein and tendencies to bulge during contraction.

Another object of the present invention is to provide an elastomeric expansion joint with specially designed internal reinforcement means which allows selective bending or flexing of the joint.

It is still another object of the present invention to provide a reinforced elastomeric expansion joint which can be selectively bent or flexed to conform to curbs and/or gutter areas which will not bulge when contracted and which provides sufficient stiffening to resist bending moments over any vehicular traffic passing across the joint.

These and other objects are achieved by providing a specially designed reinforcing member to be embedded within the elastomeric body portion of an expansion joint section. This specially designed reinforcing member is a series of longitudinally spaced plates connected by a flexible means, such as wire cable. The series of longitudinally spaced plates prevent the joint from bulging at the center when contracted and are disposed and designed to provide sufficient resistance to bending moment from forces caused by vehicular traffic passing thereover.

BRIEF DESCRIPTION OF THE DRAWINGS

FIG. 2 is a cross-sectional view of the expansion joint section according to the present invention and shown in FIG. 1 taken along Lines 2—2 of FIG. 1.

FIG. 3 is a cross-sectional view of the other joint section shown in FIG. 1 taken along Lines 3—3 of FIG. 1.

FIG. 4 is a side elevation and sectional view of the joint sections according to the present invention taken along Lines 4—4 of FIG. 1.

FIG. 5 is a partial sectional view taken along Lines 5—5 in FIG. 1 showing means to anchor the expansion joint section in place.

FIG. 6 is a perspective view of a modified internal reinforcement member according to the present invention.

FIG. 7 shows a cross-sectional view of a modified form of an expansion joint section made according to the present invention.

DETAILED DESCRIPTION

Figure 1:
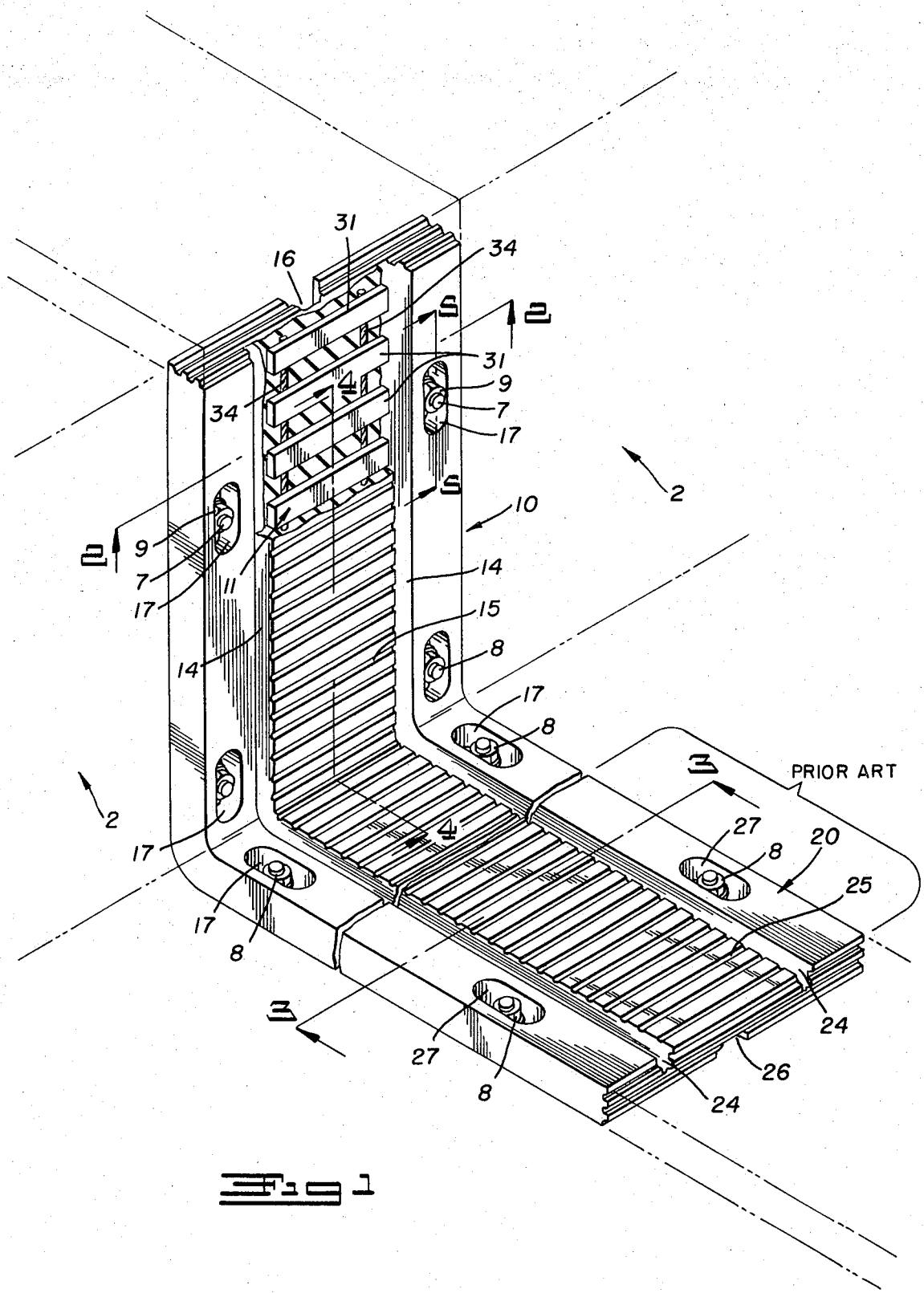
FIG. 1 is a perspective view showing a pair of joint sections, one section constructed according to the present invention with a portion thereof bent upwardly simulating conformity to a vertical curb section with portions cut away and omitted for clarity.

For a detailed description of the present invention, attention is directed to the accompanying drawings in which the invention, according to several preferred embodiments, is shown. Like numerals refer to like structural elements throughout the several views of these drawings.

FIG. 1 shows two expansion joint sections generally referenced 10 and 20 respectively. The joint 20 is representative of a typical joint section and is connected (not shown) to the joint section 10 which is made in accordance with this invention. As seen in FIG. 1, joint section 10 is bent upwardly to conform to an abrupt change in roadway surface contour such as along a curb section 2 generally indicated in outline.

As seen in FIGS. 2 and 3, each of the joint sections 10 and 20 comprise substantially identical elastomeric body portions 12 and 22 respectively. Each body portion 12 and 22 have similar top surfaces with grooves 14 and 24 respectively and similar bottom surfaces with a groove 16 and 26 respectively. These grooves open or close to accommodate widthwise expansion or contraction of the joint section.

The joint 20, which for purposes of this description will be called a conventional joint, is provided with a centrally disposed rigid reinforcement plate 21 completely embedded within the elastomeric body 22 which extends substantially the entire length of the joint section 20. On each side of the joint are L-shaped reinforcement plates 23 which also are completely embedded within the elastomeric body 22 and extend substantially the entire length thereof. The rigid plate 21 is used to resist bending moments caused by vertical forces exerted on the joint by vehicular traffic passing over the joint. Also rigid plate 21 prevents upward buckling of the joint when contracted. The lateral or side plates 23 provide strength to the anchoring area of the joint and also serve to evenly distribute stresses along the lateral edges of the elastomeric body portion 22.

As seen in FIG. 1, both sections 10 and 20 are provided with similar non-skid surface portions 15 and 25 respectively along the top surfaces thereof. Each section 10 and 20 are provided with similar lateral recesses 17 and 27 respectively for receiving suitable means 8 for anchoring each joint between the adjacent roadway sections.

In FIGS. 1 and 4, the elastomeric expansion joint section 10, constructed in accordance with the present invention, is shown bent or flexed vertically upwardly as might be required to span an expansion gap at the gutter and curb section of a roadway. Thus, a portion thereof extends vertically along the curb while the remaining portion thereof extends horizontally to abut the conventional roadway expansion joint member or section 20.

The principal differences between the flexible or bendable joint 10 and the conventional roadway joint is in the internal or embedded reinforcement means. It is seen in FIG. 2 that the flexible section 10 includes three internal reinforcing members, a central member 11 and side members 13. The side members 13, like member 23 in joint 20, extend the full length of the elastomeric body 12. Side members 13 are however flat plates rather than L-shaped as plates 23. As seen in FIGS. 1 and 4, the central reinforcing member 11 comprises a series of spaced plates 31 connected to each other by a pair of longitudinally extended metal cables 34. Because the cables 34 are relatively flexible, the joint 10 can be bent or flexed between any two longitudinally spaced plates 31 as clearly seen by FIG. 4. Also, as indicated in FIG. 4 by the phantom line, it is possible to flex or bend joint 10 to conform to peculiar curb sections which are sometimes in practice not strictly 90° to the roadway.

The flexible joint 10 is anchored to both the horizontal roadway portion and vertical curb face 2 in any manner typically used to anchor the conventional joints. For example, as seen in FIG. 5, the concrete portion 5 may be provided with protruding studs 7 with threaded ends. The threaded ends extend into the recesses 17 along the sides of joint 10 and through openings 18 in side members 13. A nut 9 tightened on threaded stud 7 thus securing the joint in place.

FIG. 7 shows the cross-section of flexible or bendable elastomeric expansion joint section typically used for wider expansion gaps. This expansion joint section generally indicated 50 comprises an elastomeric body 52, side plates 54, similar to side plates 13 in joint 10, and three reinforcing members 62, 64, and 66 made in accordance with the present invention. The upper surface of joint 50 is provided with four expansion grooves 56 and the lower surface thereof provided with two expansion grooves 58. The central reinforcing member 66 comprises a series of longitudinally spaced metal plates 67 similar to plates 31 in joint 10 which plates 67 joined by a pair of flexible cables 68. The two reinforcing members 62 and 64, which are spaced to either side of reinforcing member 66, each include a series of longitudinally spaced identical plates 63 joined by suitable cables 69. The plates of reinforcing members 62 and 64 being preferably of lesser thickness than the plates of central reinforcing member 66.

The series of plates in the several reinforcing members shown which are constructed in accordance with the invention (e.g., member 11 in FIGS. 1, 2 and 4 and members 62, 64 and 67 in FIG. 7) are preferably aligned so as to be substantially parallel to the top surfaces of the joint. The pairs of flexible cables (e.g. cables 34 in FIGS. 1, 2 and 4 and cables 68 and 69 in FIG. 7) can be secured to the plates by welding. Alternatively as seen in FIG. 6, a typical series of plates 31' may be provided with cable receiving grooves 35' and the flexible cables 34' fitted therein to connect said plates.

It is preferred that the plates comprising a reinforcing member made in accordance with the invention are equal in length, width, and thickness. Also it is preferred that the spacings between plates are equal for any given reinforcing member made in accordance with the present invention. It is understood however that departures may be made from such preference in unusual circumstances. There could be circumstances requiring that one or more of the spaced plates are to be different in one or more dimensions relative to the other plates. Also, it may be necessary to provide variable spacings between plates of a given reinforcing member. In any event, it is preferred to provide some flexible means for joining the plates so to maintain their proper alignment within the body particularly during the manufacture of the joint section in which they are used. It would be possible to provide means associated with the mold to maintain the proper alignment of the plates such as locating pins. The flexible connection approach (e.g. cable) however is considered more practical.

Although the joints described in detail herein are shown with two and four expansion grooves respectively in the top surfaces thereof it is understood that any number of grooves may be used, and also that the cross-sectional shape and longitudinal configuration thereof may be modified without departing from the scope of the present invention.

It is also understood that although the foregoing description describes joint sections having totally or completely embedded rigid reinforcing members, that the instant invention applies equally to joint sections which have partially embedded rigid reinforcement members (i.e., reinforcement members with all or some portion of one surface exposed along the top, bottom and/or sides of the elastomeric body member).

The particular elastomer used for the joints herein described are selected on the basis of many factors, some of which are cost, ease of fabrication, resistance to the elements such as ice and snow and uniformity of properties over wide ranges of temperature, wear, etc. Typical types of elastomers possible are neoprene, ethylene-propylene, styrene-butadiene copolymer, butyl and natural rubbers.

Finally, the several joint sections shown in the various views are what are commonly referred to as "shear-type" expansion joints. In such joints, expansion and/or contraction is effected through a shearing action of certain portions of the rubber body members. For example, in the joint 10 as shown in FIG. 2, expansion or contraction is achieved through shear of the columns of rubber 72 and 74, respectively. Roadway expansion member 20 expands or contracts through shear of columns 90. Finally, in the larger expansion joint section 50, expansion and contraction is accommodated through shear of the rubber in columns 82, 84, 86 and 88, respectively. It is understood however that the advantages of this invention may be realized in elastomeric expansion joints of any type in which reinforcement is effected by rigid elastomeric plates which normally extend the length of the elastomeric body in which they are embedded.

What is claimed is:

1. An elastomeric expansion joint section in the curb and gutter area of an expansion gap between adjacent sections of a roadway, said joint section comprising a body of elastomeric material having a substantially planar top surface, a first portion of said body disposed in a substantially horizontal plane, and a second portion of said body bent such that said second portion is disposed in a plane intersecting said plane of disposition of said first portion, at least one reinforcing member completely embedded within said body and extending substantially the entire length thereof, said reinforcing member comprising a plurality of longitudinally spaced metal plates disposed in a plane substantially parallel to said top surface of said body, said plates being joined together by a pair of laterally spaced, substantially mutually parallel, longitudinally extending flexible metallic cable members.

2. The invention as defined in claim 1 wherein the longitudinal spacings between said plates are substantially equal.

3. The invention as defined in claim 1 wherein all of said plates are substantially equal in length, width, and thickness.

* * * * *